(12) United States Patent
Drie

(10) Patent No.: US 6,322,056 B1
(45) Date of Patent: Nov. 27, 2001

(54) SUBMARINE TYPE LIQUID MIXER WITH AERATION

(76) Inventor: Gerhardt Van Drie, 724 W. Pine Ave., El Segundo, CA (US) 90245

(*) Notice: Subject to any disclaimer, the term of this patent is extended or adjusted under 35 U.S.C. 154(b) by 0 days.

(21) Appl. No.: 09/670,099

(22) Filed: Sep. 26, 2000

Related U.S. Application Data

(60) Provisional application No. 60/156,426, filed on Sep. 28, 1999, now abandoned, and provisional application No. 60/187,627, filed on Mar. 8, 2000, now abandoned.

(51) Int. Cl.[7] ............................................. B01F 3/04
(52) U.S. Cl. ........................... 261/81; 261/120; 261/123
(58) Field of Search ............................... 261/81, 82, 120, 261/123, DIG. 47

(56) References Cited

U.S. PATENT DOCUMENTS

| | | | |
|---|---|---|---|
| 659,625 | * 10/1900 | Norcross et al. | 261/81 |
| 707,973 | * 8/1902 | Leckband | 261/123 |
| 1,275,583 | * 8/1918 | Mathys | 261/81 |
| 1,727,601 | * 9/1929 | Imhoff | 261/DIG. 47 |
| 1,743,550 | * 1/1930 | Imhoff | 261/123 |
| 2,499,816 | * 3/1950 | Carter, Jr. | 261/81 |
| 2,715,099 | * 8/1955 | Stuart | 261/DIG. 47 |
| 2,784,150 | 3/1957 | Rose et al. . | |
| 3,685,810 | * 8/1972 | Calcote | 261/81 |
| 3,773,015 | 11/1973 | Cruickshank et al. . | |
| 3,788,616 | 1/1974 | Clough, Jr. . | |
| 4,363,212 | 12/1982 | Everett . | |
| 4,595,296 | 6/1986 | Parks . | |
| 4,737,036 | 4/1988 | Offermann . | |
| 4,779,990 | 10/1988 | Hjort et al. . | |
| 4,919,849 | 4/1990 | Litz et al. . | |
| 5,156,788 | 10/1992 | Chesterfield et al. . | |
| 5,198,156 | 3/1993 | Middleton et al. . | |
| 6,029,955 | * 2/2000 | Drie | 261/81 |

FOREIGN PATENT DOCUMENTS 1400651    9/1986 (SU) .

* cited by examiner

Primary Examiner—C. Scott Bushey
(74) Attorney, Agent, or Firm—Gene Scott-Patent Law & Venture Group

(57) ABSTRACT

A process is supported in a mixing tank providing a partition dividing the mixing tank into two separate side-by-side cells, the mixing tank further providing a fixed ceiling. A vertical beam engages with and extends upwardly from the mixing tank above the fixed ceiling of the tank and terminates at a pivotal coupling. A supporting beam is joined medially with the pivotal coupling of the vertical beam, for see-saw type tilting motion about the vertical beam, the supporting beam providing a further pivotal coupling at each terminal end. A pair of vertical linear struts, each is pivotally coupled at an upper end with one of the pivotal couplings at the terminal ends of the supporting beam, and each rigidly is joined at a lower end to a buoyancy shell within one of the cells. Each of the linear struts passes through an aperture in the fixed ceiling of the mixing tank, so as to accommodate lateral motion of the linear struts as the support beam moves in a see-saw type tilting motion. The buoyancy shells each provide a downwardly facing, upwardly concave surface for capturing gas bubbles to provide a buoyancy force to the struts. A pair of lightweight cover plates are supported on a horizontal upfacing surface of the fixed ceiling, the cover plates being positioned for sealing the ceiling apertures wherein, each of the lightweight covers is engaged with one of the linear struts, the struts each extending through a clearance hole in one of the cover plates, the clearance holes being of such a size as to allow the free passage of the linear struts while enabling interior edges of the clearance holes to wipe sludge from the linear struts.

4 Claims, 2 Drawing Sheets

SUBMARINE TYPE LIQUID MIXER WITH AERATION

The present invention claims the priority dates of two prior filed provisional patent applications having Ser. No. 60/156,426 and 60/187,627, filed on Sep. 28, 1999 and Mar. 8, 2000, respectively, both of which are now abandoned, and which disclose substantially the same material as described herein.

BACKGROUND OF THE INVENTION

1. Field of the Invention

This invention relates generally to large scale water treatment mixing apparatus' and more particularly to such apparatus' wherein the gravitational force is used to move mixing blades downwardly and buoyancy forces are used to move the mixing blades upwardly. The apparatus is kind to bacteria in the biological process and additionally with the use of high concentrations of pure oxygen provides an ideal environment for destruction of organic materials. The apparatus can be used in the first stage of settling tanks to mix water treatment chemicals with sewage effluent for removal of sewage sludge and water treatment sludge from the liquid in the settling tank simultaneously.

2. Description of Related Art

The following art defines the present state of this field:

Rose et al., U.S. Pat. 2,784,150 describes a vacuum still capable of equilibrium evaporation with no bumping comprising a still pot having two necks, one of said necks being connected to a longitudinally extended tube closed at its far end, the second of said necks being connected to condensing means; the first of said necks and its attached tube having extending therein an agitator comprising an elongated shaft having disposed along its midsection in a spaced relationship a plurality of inverted cup-shaped baffles, each baffle having a plurality of perforation spacedly disposed over its surface, said shaft passing through the center of, and being rigidly attached to, each baffle, said shaft further having attached to its lower end an open-spiral elastic spring and to its upper end a totally enclosed chamber containing a soft iron core; the aforementioned tube attached to the first neck being surrounded near its upper end by a solenoid capable of imparting a vertically reciprocating motion to the enclosed agitator when said solenoid is cyclically activated and deactivated by passage of electric current therethrough.

Clough, Jr., U.S. Pat. No. 3,788,616, teaches a "system for simultaneously aerating and agitating a body of liquid. The system comprises a body that is pivotally mounted in the liquid with its pivot point located intermediate its ends, and means for feeding air to the lower side of the body. The body is adapted to trap alternately at each end sufficient air to cause that end to rise in the liquid, and means are provided for releasing the air trapped at each end of the body when that end has risen a predetermined amount, with the result that the body oscillates on its pivot axis in see-saw fashion".

Cruickshank et al., U.S. Pat. No. 3,773,015 describes valve arrangement used to control the release of air from the helmet of a miniature diver so as to cause the diver to periodically dive and ascend within an aquarium tank. The cycle period can be varied by controlling the rate at which air is supplied from a conventional aquarium air source. The diver is slidably mounted on a hollow tube for movement between first and second stations. At the first station, the tube has an opening to admit air to the interior of the diver to increase its buoyancy. The admitted air is retained in the diver until it reaches the second station. The tube has a necked down portion at the second station to release the air contained within the diver.

Everett, U.S. Pat. No. 4,363,212, teaches a "buoyancy prime mover that converts the potential energy of a gas buoyant within a liquid into rotating mechanical energy comprises a plurality of rigid or collapsible buckets joined by one or more chains with rotatable sprockets and shafts to form a continuous loop so that when the buoyant gas is trapped within the buckets, the buckets rise through the liquid and rotate the chain and sprockets to generate power".

Parks, U.S. Pat. No. 4,595,296, teaches an invention which "relates to a mixing and blending system in which pulsed air or gas bubbles of predetermined variable size and frequency are injected into a tank containing materials to be agitated or stirred for mixing or blending. The air introduced at the bottom of the tank through an air inlet opening. There may be more than one air inlet and the inlets may be provided with accumulator plates depending upon diameter and height of the tank in which the mixing and blending is taking place. The inlets are located so as to create circular torroidal flow of fluid in a generally vertical plane. The accumulator plate has the purpose of assisting the formation of essentially a single bubble from the compressed air charge made to the air inlet and increasing the time required for the bubble to rise through the liquid by causing it to be formed more quickly and closer to the bottom of the tank. Hence, the accumulator plate is utilized in low viscosity liquids such as water".

Offermann, U.S. Pat. No. 4,737,036 describes a device for shipping cream or egg whites having a cup-shaped cylindrical housing with a performed bottom, a cap releasably locking the open top, a perforated plunger piston connected to one end of the piston rod and movable within the housing, the piston rod being movable through the cap and formed with a handle at its opposite end, one of two perforated plates spaced from the plunger piston on the piston rod. The perforated disc is biased by a spiral coil spring from the plunger and may be further biased from a second perforated disc. When the discs and plunger are compressed together, any product between them is squeezed out through their holes.

Hjort, et al, U.S. Pat. No. 4,779,990, teaches an "impeller apparatus for dispersing a gas into a liquid in a vessel includes a centrifugal flow turbine, the blades of which are formed with a substantially streamlined trailing surface terminated by a sharply pronounced spine. The blade is formed by a plate-like initial blank being cut to a shape having a central line of symmetry, the blank then being folded along the straight line of symmetry.

Litz, et al, U.S. Pat. No. 4,919,849, teaches a "gas-liquid mixing process and apparatus having a vessel with an axial flow down-pumping impeller in a draft tube has gas ingestion tubes extending into a body of liquid from a hollow portion of the impeller shaft or other fluid communication means with the overhead gas in the vessel. Upon gas-liquid mixing at liquid levels that interfere with vortex development by the impeller, gas is drawn from the overhead through the ingestion tubes into the body of liquid".

Chesterfield et al, U.S. Pat. No. 5,156,788, teaches a "device for use in the mixing of fluids, e.g. the gasification of liquids, comprises an elongate member including an internal passage; and, mounted on the elongate member via radial arms, one or more venturi members each having a convergentdivergent duct whose axis is substantially tangential to the elongate member, and in which the neck of the duct has an opening in communication, via passages in the radial, with the internal passage. On rotation of the device, reduced pressure in the duct neck draws fluid down the shaft of the elongate member".

Middleton, et al, U.S. Pat. No. 5,198,156, teaches a turbine agitator assembly including a reservoir for liquid, a rotor mounted in the reservoir and with a plurality of radially extending blades, and sparger means for introducing a fluid into liquid in the reservoir. The fluid sparger means and the rotor are so constructed and arranged that, in use, the rotor blades (submerged in the liquid) and/or the liquid flow they generate disperse the sparged fluid. Each of the blades is hollow and has a discontinuous leading edge, only a single trailing edge along an acute angle, no external concave surface and an open radially outer end.

Stavropol Agric Ins, SU 1400651 describes a mixer comprising a cavity with a conical bottom equipped with a heater and mixing device. The latter is made in the form of a bell positioned in the cavity. The bell is equipped in the upper part with a by-pass valve, connected to the rod, whose length is greater than the bell height by a distance equal to total of the cone bottom height and valve slide valve run. A rigid net partition, separating the cavity from the gas carrier, is attached to the cavity cover. The bell floats up due to the buoyancy force which occurs when the biogas accumulates under it. The valve strikes the partition and opens. When the biogas leaves from under the bell, it drowns and valve closes with the help of rod. Mixer is used for mixing liquid media applied in aerobic fermentation of livestock farming wastes. Its structure is simplified and power losses are decreased.

The prior art teaches the use of mixers similar in concept and construction to the present invention, but the prior art does not teach how to achieve the goals of the present invention. The present invention fulfills these needs and provides further related advantages as described in the following summary.

SUMMARY OF THE INVENTION

The present invention teaches certain benefits in construction and use which give rise to the objectives described below.

The Earth is a watery world but only about three percent of the free water on the planet's surface is potable. As the world population grows, potable water continues to become more valuable and the demand on more economic recycling techniques grows. The present invention teaches a highly efficient and critical element in such recycling technology, the mixing of sewage and sludge reclaiming tanks. Mixing is critical in the chemical equation of water treatment, and yet it is carried out, globally, in a costly manner using much more energy, mostly electricity, than is necessary or warranted.

The demands of industry and irrigation can be easily satisfied with reclaimed water and a principle source of this water is the effluent from local sewage treatment plants. A cost-effective solution for organic material, suspended solids, nitrogen and phosphorus reduction would allow reclaimed water to be made available in most major population centers. The present invention provides a low cost solution by enabling water treatment while the water is contained, conveyed or otherwise treated, and especially in the final clarification vessel. An important part of this solution is the combining of the settling of sludge from the water treatment process at the same time as settling sludge from waste water, together, uniformly.

The invention uses a mixing tank providing a partition dividing the mixing tank into two separate side-by-side cells, the mixing tank further providing a fixed ceiling. A vertical beam engages with and extends upwardly from the mixing tank above the fixed ceiling of the tank and terminates at a pivotal coupling. A supporting beam is joined medially with the pivotal coupling of the vertical beam, for see-saw type tilting motion about the vertical beam, the supporting beam providing a further pivotal coupling at each terminal end. A pair of vertical linear struts, each is pivotally coupled at an upper end with one of the pivotal couplings at the terminal ends of the supporting beam, and each rigidly is joined at a lower end to a buoyancy shell within one of the cells. Each of the linear struts passes through an aperture in the fixed ceiling of the mixing tank, so as to accommodate lateral motion of the linear struts as the support beam moves in a see-saw type tilting motion. The buoyancy shells each provide a downwardly facing, upwardly concave surface for capturing gas bubbles to provide a buoyancy force to the struts. A pair of lightweight cover plates are supported on a horizontal upfacing surface of the fixed ceiling, the cover plates being positioned for sealing the ceiling apertures wherein, each of the lightweight covers is engaged with one of the linear struts, the struts each extending through a clearance hole in one of the cover plates, the clearance holes being of such a size as to allow the free passage of the linear struts while enabling interior edges of the clearance holes to wipe sludge from the linear struts. The present invention restricts the loss of process gases, through the use of the cover plates, while enabling higher gas entrainment through the use of plural gas inlets and through liquid mixing. This combination of these effects provides a drastic reduction in process time.

A primary objective of the present invention is to provide an apparatus and method of use of such apparatus that provides advantages not taught by the prior art. The invention uses high volume gas delivery, tank sealing and gentle, but rapid- mixing, in combination, to achieve significant improvements in the art.

Another objective is to provide such an invention capable of entraining gas into a process liquid at a very high rate.

A further objective is to provide such an invention capable of being operated with the support of simple buoyancy and gravity forces.

A still further objective is to provide such an invention capable of inexpensive operation. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
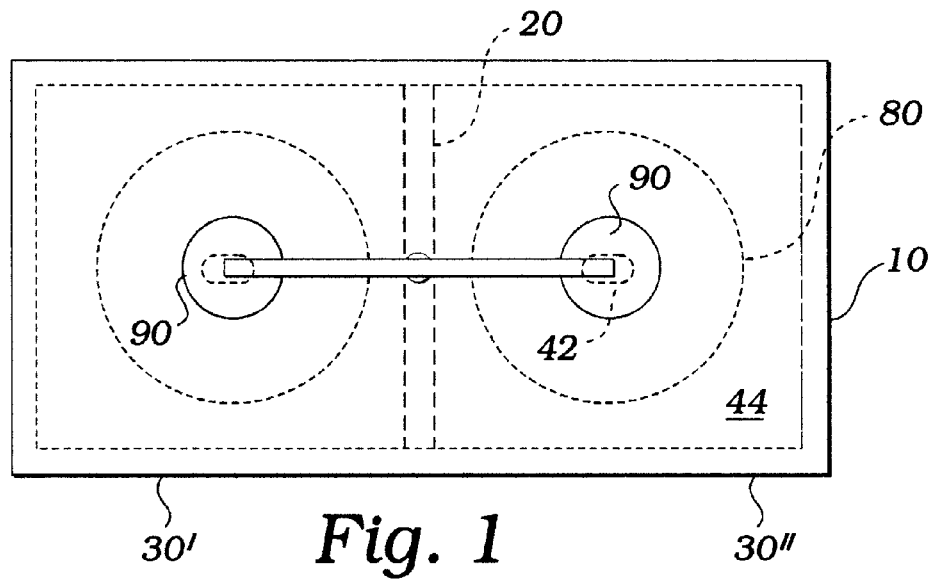
FIG. 1 is a top plan view of the preferred embodiment of the invention.
Figure 2:
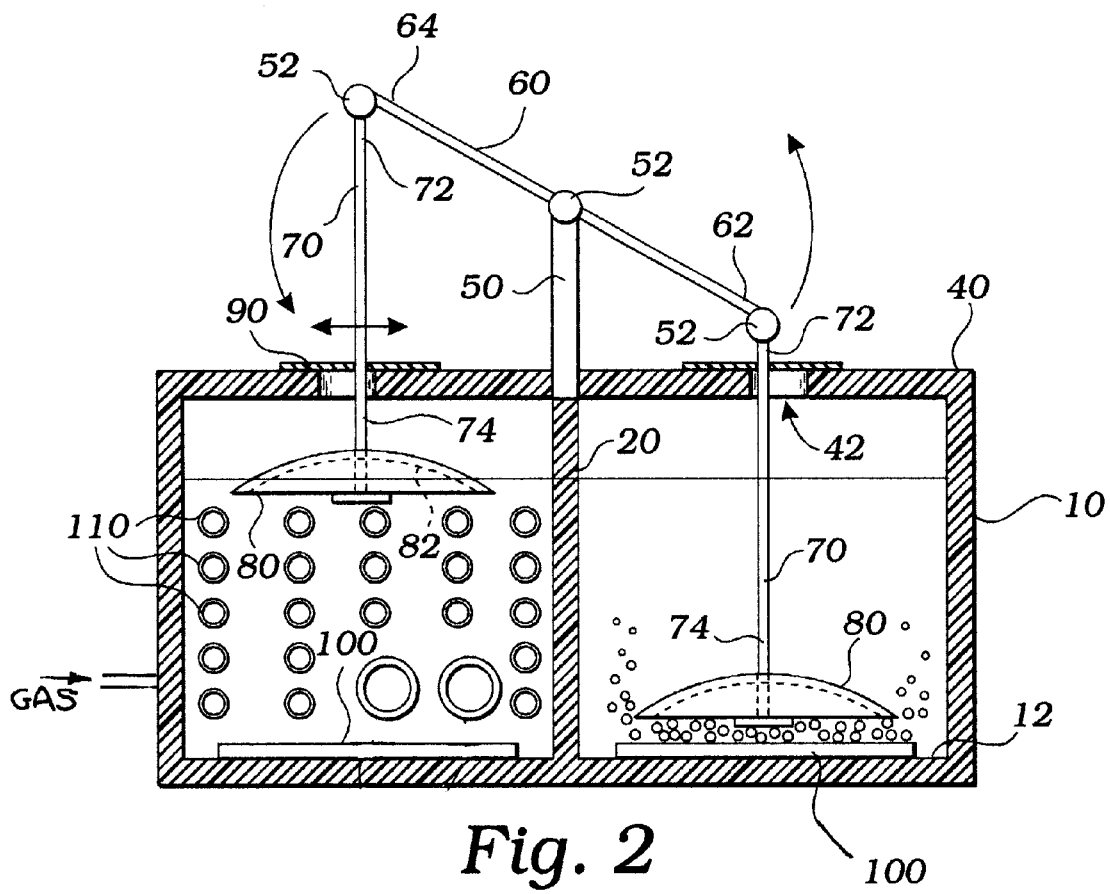
FIG. 2 is a side elevational section view thereof.

The apparatus of this invention, as shown in FIGS. 1 and 2, comprises a mixing tank 10, typically constructed of concrete, providing a full height partition 20 dividing the mixing tank 10 into two separate side-by-side cells 30', 30". The mixing tank 10 further provides a fixed ceiling 40. A vertical beam 50 engages with and extends upwardly from the mixing tank 10 above the fixed ceiling 40 and terminates at a pivotal coupling 52. A supporting beam 60 is joined medially with the pivotal coupling 52 so that see-saw type tilting motion about the vertical beam 50 is enabled. See the arrows in FIG. 2. The supporting beam 60 provides a further pivotal coupling 52 at each terminal end 62, 64. A pair of vertical linear struts 70, are each pivotally coupled at an upper end 72 with one of the pivotal couplings 52 at the terminal ends 62, 64 of the supporting beam 60, and each is rigidly joined at a lower end 74 thereof to a buoyancy shell 80 within one of the cells 30', 30" of the mixing tank 10.

Figure 4:
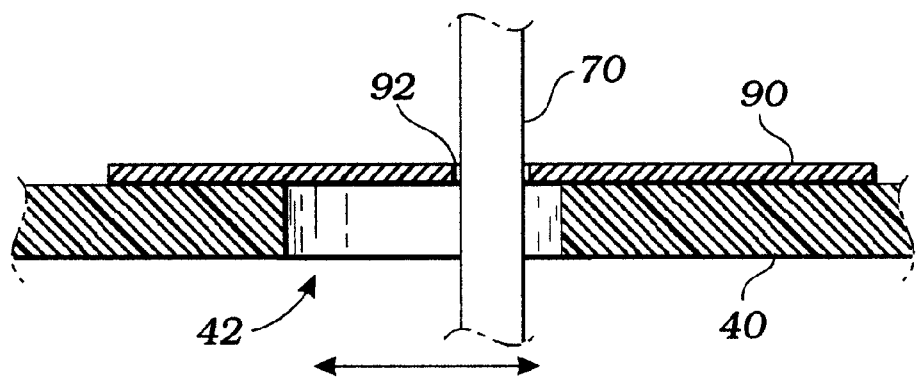
FIG. 4 is side elevational section view thereof.

As clearly shown in FIG. 4, each of the linear struts 70 passes through an aperture 42 in the fixed ceiling 40 of the mixing tank 10, where each of the apertures 42 has such girth as to accommodate lateral (horizontal) motion of the linear struts 70 as the supporting beam 60 moves with the tilting motion. See the arrow in FIG. 4. Clearly, the ends of beam 60 move in vertical arcuate motion so that the linear struts 70 not only move vertically, but also horizontally. This provides a problem when the tank 10 must be closed so as to retain gases evolved above the liquid in the tank 10. This will be further addressed below.

Figure 3:
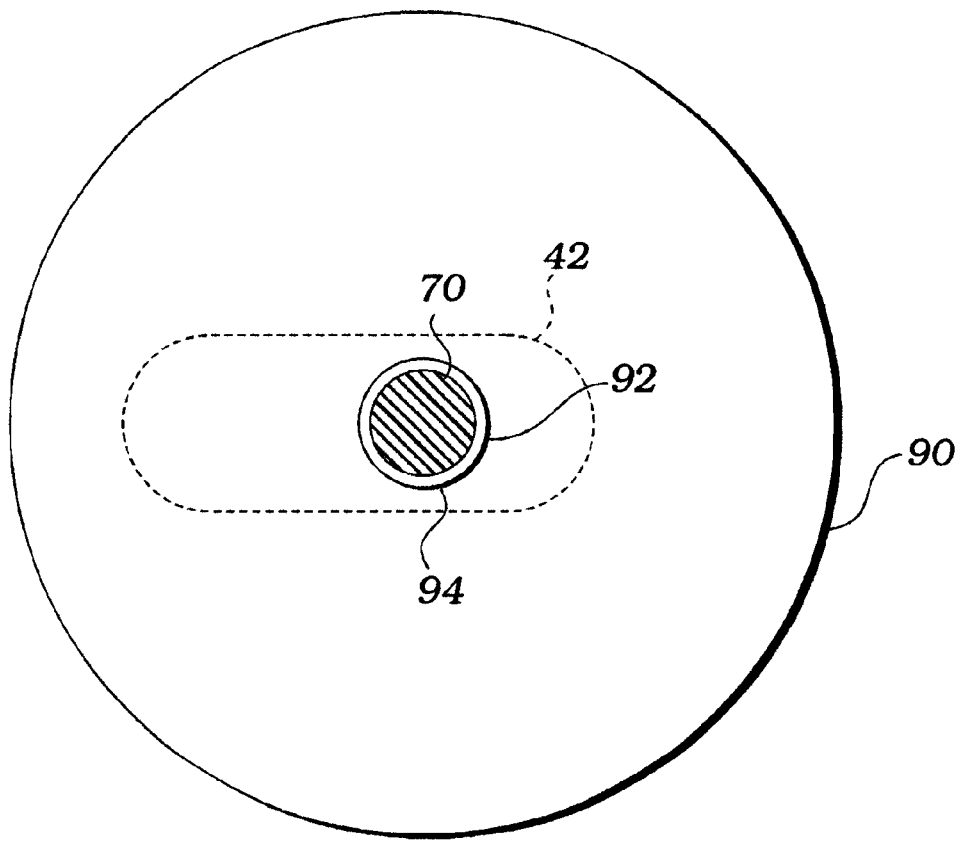
FIG. 3 is a top plan view of a cover plate thereof.

The buoyancy shells 80 each provide a downwardly facing, upwardly concave surface 82 for capturing gas bubbles so as to provide a buoyancy force to the struts 70. Such bubbles may be naturally evolved within the liquid due to chemical processes, or they may be released from a purposeful gas inflow into the tank 10. A pair of lightweight cover plates 90, which may be constructed of metal or plastic, are supported on a horizontal upfacing surface 44 of the fixed ceiling 40, the cover plates 90 being of a size and are positioned for generally sealing the apertures 42 in the ceiling 40. Each of the lightweight cover plates 90 is engaged with one of the linear struts 70 as shown in FIG. 3, the struts each extending through a clearance hole 92 in one of the cover plates 90, the clearance holes 92 of such a size as to allow the free passage of the linear struts 70 while enabling interior edges 94 of the clearance holes 92 to wipe sludge from the linear struts 70. The cover plates 90 are pushed back and forth by the linear struts 70 as the struts move laterally. A gas releasing means 100, such as the diffusing register shown, is mounted on a floor 12 of the mixing tank 10, and is enabled, as is known in the art, for releasing gas bubbles below the buoyancy shells 80 so as to be captured by the downwardly facing, upwardly concave surfaces 82. The gases released and captured by the shells 80 drives each of the shells, in turn, upwardly, whereupon the gas is released at the top of the tank 10. At this time the upper shell 80 has lost its buoyancy force while the lower shell 80 has just received some of the gas and such enables the two shells to reverse positions. This up and down cyclic motion of the shells mixes the liquid in the tanks at a small fraction of the cost of using electric motors. The apparatus preferably comprising a further gas releasing means 110 including a plurality of gas discharge outlets spaced apart on the interior wall of the mixing tank 10 so as to release a gas within the liquid in the mixing tank 10 in such a manner as to provide significant improvement in gas uptake rate. Clearly an improvement in the rate in which gas may be entrained within a process fluid is important to the efficiency of many processes and results in cost savings realized through the cost of plant construction vs. the payback in processing capacity.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus comprising:
    a mixing tank substantially closed to atmosphere providing a fixed ceiling and an interior wall surface;
    a vertical beam engaged with and extending upwardly from the mixing tank above the fixed ceiling of the tank and terminating at a pivotal coupling;
    a supporting beam joined medially with the pivotal coupling of the vertical beam, for see-saw tilting motion about the vertical beam, the supporting beam providing a further pivotal coupling at each terminal end thereof;
    a pair of vertical linear struts, each pivotally coupled at an upper end thereof with one of the pivotal couplings at the terminal ends of the supporting beam, and each rigidly joined at a lower end thereof to a buoyancy shell for immersion in a liquid within a cell of the mixing tank, each of the linear struts passing through an aperture in the fixed ceiling of the mixing tank, each of the apertures having such girth as to accommodate lateral motion of the linear struts as the support beam moves with said see-saw tilting motion;
    the buoyancy shells each providing a downwardly facing, upwardly concave surface for capturing gas bubbles to provide a buoyancy force to the buoyancy shells in the liquid.

2. The apparatus of claim 1 further comprising a pair of lightweight cover plates supported on a horizontal upfacing surface of the fixed ceiling, the cover plates of a size and position for sealing the apertures in the ceiling, each of the lightweight covers engaged with one of the linear struts, the struts each extending through a clearance hole in one of the cover plates, the clearance holes of such a size as to allow the free passage of the linear struts while enabling interior edges of the clearance holes to wipe sludge from the linear struts.

3. The apparatus of claim 1 further comprising a gas releasing means on a floor of the mixing tanks, the gas releasing means enabled for releasing a gas below the buoyancy shells so as to be captured by the downwardly facing, upwardly concave surfaces.

4. The apparatus of claim 1 further comprising a gas releasing means including a plurality of gas discharge outlets spaced apart on the interior wall of the mixing tank so as to release a gas within the liquid in the mixing tank.

\* \* \* \* \*